United States Patent [19]

Bost et al.

[11] Patent Number: 4,961,687
[45] Date of Patent: Oct. 9, 1990

[54] FASTENING DEVICE INCLUDING SLEEVES, AND ROTOR BLADE EQUIPPED WITH SUCH A DEVICE FOR FASTENING TO A HUB

[75] Inventors: Michel Bost, Joinville le Pont; Alain Chasson, Villeneuve La Garenne, both of France

[73] Assignee: Aerospatiale Societe Nationale Industrielle, Paris Cedex, France

[21] Appl. No.: 242,409

[22] Filed: Sep. 8, 1988

[30] Foreign Application Priority Data

Sep. 9, 1987 [FR] France ................ 87 12529

[51] Int. Cl.⁵ ............................. B64C 27/46
[52] U.S. Cl. ...................... 416/230; 416/134 A
[58] Field of Search ............ 416/230 R, 230 A, 226, 416/248, 239, 500, 134 A, 229 R; 411/60, 57

[56] References Cited

U.S. PATENT DOCUMENTS

| | | | |
|---|---|---|---|
| 1,469,669 | 10/1923 | Pleister | 411/60 |
| 2,384,918 | 9/1945 | Houk | 411/60 |
| 3,484,174 | 12/1969 | McCoubrey | 416/226 |
| 3,603,626 | 9/1971 | Whiteside | 411/60 |
| 3,720,481 | 3/1973 | Motta | 416/230 |
| 3,923,422 | 12/1975 | Ianniello et al. | 416/230 A |
| 4,038,885 | 8/1977 | Jonda | 416/134 A |
| 4,120,610 | 10/1978 | Braswell et al. | 416/226 |
| 4,474,515 | 10/1984 | Pitzer | 411/60 |
| 4,504,193 | 3/1985 | Mouille | 416/134 A |
| 4,547,127 | 10/1985 | Frommlet et al. | 416/134 A |
| 4,654,210 | 3/1987 | Leman et al. | 416/134 A |

FOREIGN PATENT DOCUMENTS

| | | | |
|---|---|---|---|
| 1575548 | 11/1967 | France | 411/60 |
| 2001025 | 1/1979 | United Kingdom | 416/226 |

Primary Examiner—John T. Kwon
Attorney, Agent, or Firm—Pollock, Vande Sande & Priddy

[57] ABSTRACT

A fastening device including sleeves (2, 6) for absorbing forces, and a rotor blade (10) equipped with such a device for fastening to a hub (23). The device comprises an inner metallic sleeve (2) having a cylindrical central bore (4) and having a frusto-conical outer lateral face which is pressed coaxially and is affixed in the frusto-conical inner bore of an outer sleeve (6) provided with a slot (9) along one of its generatrices, and fitted into a recess delimited in the blade root (10) by a loop (12a) formed of bands (21) of rovings of the spar of the blade. The fitting of the two sleeves into one another involves a deformation by radial expansion of the outer sleeve (6), which adapts itself to the diameter of the recess provided in the composite materials of the blade root. The invention applies to helicopter rotor blades.

8 Claims, 1 Drawing Sheet

FASTENING DEVICE INCLUDING SLEEVES, AND ROTOR BLADE EQUIPPED WITH SUCH A DEVICE FOR FASTENING TO A HUB

FIELD OF THE INVENTION

The present invention relates to a fastening device including metallic sleeves for absorbing forces, the sleeves being inserted into composite structures, and especially composite structures having a fiber reinforcement which is embedded in a matrix of synthetic material, and having at least one bore for accommodating the sleeves, which are themselves intended to be traversed by an axle for holding the corresponding composite structure on a support, in order to ensure a mechanical linkage which, when it is subjected to forces of traction-compression of the structure in relation to the support, permits the absorption of these forces in the form of radial forces taken up by the sleeves.

More specifically, the invention relates to such a device including sleeves which is intended for fastening, onto a support, an element which is essentially constructed of composite materials, and comprising at least one bundle of continuous, mineral and/or organic filaments having high mechanical strength and agglomerated by a polymerized synthetic resin, which forms at least one loop and is intended to be subjected to at least large traction loads, the metallic sleeves of the device being accommodated in an individual loop and being traversed by an axle for holding of the support.

In particular, such devices including sleeves can be used for the fastening of rotor blades, especially of aerodynes having an at least partially rotating wing system, such as helicopters, onto the hub of a rotor or onto a component such as an armature, strap or a ferrule for connection to the hub, when each blade is essentially constructed of composite materials and has a resistant frame which comprises at least one spar comprising at least one bundle or hank of continuous mineral or organic filaments having a high mechanical strength and agglomerated by a polymerized synthetic resin, and which forms, in the root of the spar by which the blade is intended to be fastened to the hub or to the component for connection to the hub of the rotor, at least one loop in which there is accommodated and integrally mounted an inner ring system, consisting of metallic sleeves for absorbing forces and traversed by an axle for holding onto the hub or onto the component for connection to the latter.

BACKGROUND OF THE INVENTION

In such blades, it is known that the bundle of continuous filaments may advantageously be constructed in the form of a plurality of bands attached and agglomerated to one another, of unidirectional and longitudinal rovings (i.e., which extend along the longitudinal axis or the span of the blade), which are agglomerated by a thermosetting and polymerized impregnation synthetic resin, and which are wound around the sleeves in such a manner as to constitute a fastening loop.

The fastening device including sleeves according to the invention can be used in a general way in the field of construction, and especially of aeronautical construction, in order to ensure the connection, to a support, of a composite filamentary component, subjected to very large traction loads and in which the sleeves are integrated, by means of an axle or of an arbor traversing the sleeves. In other words, to construct the inner ring system for absorbing forces of a bore of a composite filamentary element which is to be connected to a support by a mechanical connecting axle traversing the ring system and subjected to large radial forces, the fastening device including metallic sleeves according to the invention will be described exclusively in its application to the connection of the rotor blades of rotor aircraft to the hub or to a component for connection to the corresponding hub, when the blades are constructed of composite material and when their roots have at least one loop formed by a winding of rovings. In this field of application the fastening device according to the invention appears to provide the greatest benefit, by reason of the magnitude of the traction centrifugal force which urges the fastening of each blade in rotation onto the hub and which ranges from 10,000 to 40,000 daN for current helicopters, depending upon their size.

In order to connect the root of such a helicopter rotor blade to its hub, by attaching it, for example, to a rigid support strap exhibited either directly by the hub or by an armature shaped in the form of a double strap or ferrule for connection to the hub, use has already been made of fastening sleeves of biconical external shape, and each traversed axially by a cylindrical bore for accommodating the retaining arbor or axle. The advantages of these biconical sleeves were, on the one hand, that of facilitating the closure on one another of the upper surface and lower surface half-molds cooperating and assembled to constitute a mold for polymerization of the blade constructed of composite material in the course of its production and, on the other hand, that of permitting a definitive capture of each biconical sleeve in the corresponding blade root to be obtained. As long as the rovings forming the loop of the blade root were placed in position individually and successively in the mold, it was possible to smooth them by hand one by one, in order to compensate, little by little, for the differences in length over the rovings joined at the biconical outer surface of the sleeves. However, following the appearance and the development of the techniques of utilizing rovings in a hank and of mechanical windings of rovings in the form of bands, capable of forming the hanks, it was no longer possible to maintain on the sleeves winding surfaces of conical form; the led to having rovings tight on an edge of a band (on the side of the large base of a conic section) and corrugated on the other edge of the band (on the side of the small base of the same conic portion). Moreover, the bands of rovings naturally had a tendency to escape from the periphery of the conic portions, progressively as the thickness of the stack of bands increased. These major disadvantages made it necessary to abandon the biconical sleeves, and led to the use of cylindrical sleeves.

Numerous examples of connection of helicopter blades to the corresponding rotor hubs by means of metallic and cylindrical sleeves for absorbing forces have already been proposed.

In French Pat. No. 1,544,344, which relates to a device for anchoring an element constructed of synthetic material reinforced with glass fibers and terminated by a loop, such as a rotor blade, the root of which is formed by the loop, in a metallic armature formed of two half-shells which entirely captively retain the loop, the latter is formed by means of hanks of rovings extending as far as the spar or the end of the blade, and surrounds a cylindrical sleeve which is embedded in the armature, and which is traversed by an axle for fixing to the hub of the rotor.

A contact layer, for example of fluorocarbon resin, exhibiting a high degree of resistance to shocks and to compression, a low coefficient of friction, and therefore good anti-adhesive properties and a good resistance to wear is spread, in order to reduce friction effects, between, on the one hand, the composite loop and, on the other hand, the metallic armature and the sleeve, in order to avoid the development of corrosion by friction and damage to the blade root by permitting free deformations of the blade root and of the armature independently of one another, depending upon their own elasticity modulus. In this construction, affixing is therefore avoided between the loop and the sleeve, but the retention of the loop is ensured by cooperation with the sleeve and the armature which completely envelops the loop.

French Pat. No. 1,581,324 discloses a rotor blade constructed of plastic material reinforced with fibers in the form of rovings which are longitudinal in relation to the axis of the blade, the rovings being impregnated with synthetic resin and disposed in loops in the blade root which is fixed to the hub of the rotor by bolts passing through the loops. The rovings are disposed in two hanks side by side in the drag plane, and each one of them forms, at the root of the blades, a loop or a pair of superposed loops, the two loops or pairs of loops being enveloped in a case consisting of a lower half and an upper half, which each comprise a ferrule projecting internally as far as half the height of the root of the blades, and which is engaged in each loop or pair of loops. Thus, the rovings of each loop or pair of loops pass around a cylindrical sleeve formed by the superposition or the alignment, in their axial extension, of two identical and coaxial, cylindrical ferrules traversed by the bolts for fixing to the hub.

French Pat. No. 2,004,934 likewise proposes, in order to connect a blade root to an armature for connection to a hub, cylindrical sleeves embedded in a core constructed of plastic material, of the blade spar and surrounded by fabrics or nappes of glass fibers encased in polymerized synthetic resin.

French Pat. No. 2,252,916 proposes, for the fastening of a blade root to a hub, an armature comprising a cylindrical sleeve equipped with an inner ring traversed by an arbor, the sleeve being integral with a cross-shaped tapered extension, in the form of a plate perpendicular to the sleeve at its center, and exhibiting ribs perpendicular to the plate and integral with the latter, on the side of the current part of the blade. This tapered and cross-shaped plate separates the hank of rovings forming the loop and which surrounds the sleeve into four parts separated from the sleeve and from the wings of the cross-shaped plate by laminated inserts of glass fabrics impregnated with resin to promote adherence and resistance to shear, filling elements being moreover provided in the voids delimited between the sleeve, the plate and the various parts of the hank, on the side of the current part of the blade.

French Pat. No. 2,327,858 describes a connecting element for the distributed transmission of forces in a component, the element comprising two sleeves which are coaxial and in axial alignment, each surrounded by a loop formed by a particuLar winding with one-half of a bundle of rovings of fibers impregnated with synthetic resin.

In this patent, which relates to the components constructed of plastic material reinforced with fibers and subjected to high loadings, each sleeve projects in relation to the end surface of the component, and the projecting part of the sleeve has a throat in which the fibers are wound. Furthermore, the loop surrounding the projecting part of the corresponding sleeve thins down to a thin disk, from the corresponding sleeve to the edge of the composite element, in such a manner that the high loads acting on the component are transmitted, without local concentration of stress, by a large surface to a connecting arbor traversing the sleeves. The rovings wound round are attached to the sleeves, but do not belong to the components, in such a manner that, if the latter comprises a filamentary structure, the rovings of the loops are not in any circumstances mixed with the filaments of the structure of the component. In fact, the connecting elements may be constructed in the form of prefabricated elements, each comprising sleeves with their winding and equipped with an internal ferrule, the assembly being prepared with the aid of a special tooling comprising a winding blank in rotation.

French Pat. No. 2,350,541 proposes a connection of a blade root constructed of composite material to a hub strap by bores formed in the blade root and traversed by fixing bolts, each bore being delimited by two cylindrical metallic sleeves which are in axial alignment and fixed by an elastic connecting component in an individual hole formed in the blade root. The internal ends of the two sleeves are separated from one another by a ring which is elastic and in contact with the latter, while the outer ends of the sleeves are in the planes of the opposite faces of the blade root, the two sleeves being coaxial and preferably identical.

French Pat. No. 2,390,331 describes a principal joint of a carrying wing system constructed of composite material having a matrix constructed of plastic material reinforced with fibers, for aircraft, the joint comprising a metallic shell exhibiting a central bore traversed by a principal articulation sleeve, and bordered on one side by a plurality of recesses in the form of niches in a circular arc, which are substantially concentric and divergent at their ends, to accommodate traction loops consisting of rovings. On the other side of the bore, the latter is bordered by a conical and composite compression body, between the branches of the loops proceeding out of the niches, said loops accommodated in the niches being incorporated in the structure of the wing system.

Moreover, it has likewise already been proposed, by U.S. Pat. No. 4,251,309, to connect the root of a blade to the hub of a rotor by four end loops, formed by composite bands and disposed in two pairs, symmetrical in relation to the flapping plane, of superposed and coaxial loops, a cylindrical and composite sleeve being engaged in each pair of loops, and an end cap being driven onto each sleeve portion accommodated in a loop.

Apart from the all-composite construction in this U.S. patent, and which has as a disadvantage that of multiplying the number of fastenings and thus of making the blade root very voluminous, all the other known constructions including cylindrical metallic sleeves exhibit a major and common disadvantage, which is added to the disadvantages specific to each construction, such as the presence of an elastic ring against which are applied the ends internal to the blade root of the two sleeves in French Pat. No. 2,350,541, the need to provide peripheral throats in the part of each of the two sleeves which projects in relation to the component to be attached in French Pat. No. 2,327,858, the construction of a single piece of the sleeve with a tapered and cross-shaped plate or with a shell exhibiting recesses in the form of niches in a circular arc, in French Pat. Nos. 2,252,916 and 2,390,331, respectively, and finally the cooperation of the metallic cylindrical sleeve or sleeves with a metallic armature or with a case consisting respectively of two half-shells or of a lower half and of an upper half completely enveloping the loop of the blade root, in French Pat. Nos. 1,544,344 and 1,581,324, respectively.

However, the principal disadvantage which is exhibited by all the constructions comprising metallic cylindrical sleeves arises from the fact that the sleeves used are constructed of steel and have a coefficient of thermal expansion very much greater than that of the composite materials which surround them. In molding, at a temperature which may, for example, be of the order of 120° C., the metallic sleeves expand, especially radially, and the portion of the bundle of composite rovings which surrounds them at least partially is polymerized at the greater diameter of the expanded sleeves. On cooling, the sleeves contract, especially radially, in such a manner that a radial play is formed between the sleeves and the composite material which surrounds them; under the effect of the high stresses on the blade root (centrifugal force and alternating torques), this involves jarring of each sleeve in its laminated bore, and rapid damaging of the fastening. Furthermore, in the constructions in which the rovings are affixed around the sleeves by a film of adhesive, the contraction on cooling of a sleeve creates a tearing-off on the periphery, of the corresponding film of adhesive, and this tearing-off, while not completely rupturing this film of adhesive, does however initiate zones of separation. In this case, under the effect of the strong stresses on the blade root, as well as of the ageing by penetration of humidity into the initial separation sites, the film of adhesive deteriorates rapidly until there is total disintegration of the sleeve and of the blade root. In use, a separated sleeve is the cause of various instances of damage, especially the ovalization of the laminated elements which surround it; this makes it necessary to undertake a repair with a sleeve mounted with more play, further limiting the performance of such a repair. In the constructions with rovings affixed around the sleeves, another cause of the poor adhesion of the sleeve in the corresponding laminated bore results from a very weak pressure applying the film of adhesive against the sleeve, this resulting from the fact that the polymerization takes place in a mold which is closed and non-deformable and with laminated materials impregnated with liquid resin in the course of the polymerization.

In consequence, the principal disadvantage of the known fastening devices including cylindrical metallic sleeves is that the service life of the fastening is reduced to a large extent in service as a result of the radial play resulting from the differential expansions between the sleeves end part and the composite material which surrounds them, in the course of the polymerization. Furthermore, in the constructions including rovings affixed around the sleeves, the separation of the latter involves a still greater reduction of the service life of the fastening. Trials with a separated sleeve on tail rotor blades constructed of composite material have demonstrated the very marked influence of this reduction of the service life of the fastening on blades on which it had been possible to demonstrate initially an infinite service life with correctly affixed sleeves.

SUMMARY OF THE INVENTION

By the present invention, it is proposed to improve the fatigue properties of the blade roots constructed of composite material by avoiding, essentially, the radial play of the cylindrical and metallic sleeves for absorbing the forces, in relation to the winding of the rovings constituting the end of the spar and, possibly in addition, the risk of separation of these sleeves in relation to this winding. In order to achieve this improvement, the present invention proposes to replace each sleeve or pair of metallic and cylindrical sleeves, possibly separated by an elastic ring, of the prior art by a fastening device including metallic sleeves for absorbing forces, of the type comprising two coaxial sleeves intended to be accommodated in an individual loop and traversed by an axle for holding onto the support, and which is defined in that one of the two sleeves is an inner sleeve having a cylindrical internal bore for the passage and support of the retaining axle, and a frusto-conical outer lateral face, and the other sleeve is an outer sleeve, slotted from one end to the other of its axial ends, and having a cylindrical outer lateral face, intended to be made integral with the element constructed of composite materials in the loop of which the outer sleeve is fitted, and a frusto-conical inner bore, of a shape complementary to that of the frusto-conical outer lateral face of the inner sleeve, which is intended to be pressed axially into the outer sleeve and made integral with the latter in an axial position corresponding to a predetermined deformation in radial expansion of the outer sleeve. In such a fastening device, the outer sleeve, on the one hand, deforms slightly in radial expansion under the action of the inner sleeve, and thus adapts itself to the exact diameter of the cylindrical recess formed in the composite materials which surround it and, on the other hand, can be made integral with these composite materials by an affixing which is of excellent quality.

In a simple embodiment, the outer sleeve has only one slot, which extends substantially along one of its generatrices.

Advantageously, in order to facilitate the assembly, under good conditions, of an element equipped with such a fastening device including sleeves in a supporting strap, the two sleeves of the device have substantially the same axial dimension, which is slightly greater than the thickness of the element constructed of composite material, at the location of the corresponding loop.

Advantageously, in order to maintain the zone of the loop in prestress, to promote the mechanical blocking of the device including sleeves in the recess and to improve the fatigue properties of the assembly, the two sleeves are intended to be made integral with one another by affixing of the inner sleeve in the outer sleeve in radial expansion.

The object of the invention is likewise a rotor blade, especially for an aerodyne having an at least partially rotating wing system, such as a helicopter, the blade being of the type essentially constructed of composite materials and having a resistant frame which comprises at least one spar comprising at least one bundle of continuous mineral and/or organic filaments having high mechanical strength and agglomerated by a polymerized synthetic resin, and which forms, in the root of the spar by which the blade is intended to be fastened to the hub or to a component for connection to the hub of the rotor, at least one loop in which there is accommodated and made into an integral unit an inner ring system consisting of two coaxial metallic sleeves for absorbing forces, and traversed by an axle for fixing to the hub or to the component for connection to the latter, the blade according to the invention being defined in that the two coaxial sleeves belong to a fastening device including metallic sleeves for absorbing forces, of the type specific to the invention and as presented hereinabove.

In such a blade, it is advantageous that the two sleeves of the fastening device are integral with one another by affixing of the inner sleeve in the outer sleeve. Furthermore, the two sleeves are advantageously integral with one another in a relative axial position such that the axial end faces of the two sleeves are substantially coplanar and project in relation to the opposite faces of the root of the spar, at the location of the corresponding loop, in such a manner as to form bearing faces against assembly pieces on the hub or on the component for connection to the hub. By such a cooperation of the inner and outer sleeves of the device, the outer sleeve may advantageously be made integral, by its cylindrical outer lateral face, with the composite structure of the root of the spar, by an affixing of excellent quality.

In order to protect the filaments of the bundle surrounding the outer sleeve, in relation to this outer sleeve, it is advantageous, furthermore, that the part of the cylindrical outer lateral face of this outer sleeve extending between two annular parts of this face which are adjacent the axial ends of this outer sleeve be at least partially integral with the opposite part of the bundle of filaments in its portion surrounding the outer sleeve, by means of a protection affixed both to the outer sleeve and to the bundle of filaments.

In a preferred embodiment, lending itself to an automated and simplified production process, the bundle of filaments is formed of a plurality of bands of unidirectional rovings agglomerated by an impregnation synthetic resin, the bands being attached and agglomerated to one another by the polymerized impregnation resin which ensures at the same time the affixing of the attached bands onto the protection in the part of the corresponding loop which surrounds the outer sleeve.

Furthermore, in the blade structures constructed of composite material, the root of which comprises at least one filling core, in general constructed of a light alveolar synthetic material, disposed between the two branches of the bundle of filaments forming a fastening loop and which extend the part of this bundle surrounding a sleeve for absorbing forces, it is advantageous that, according to the invention, the part of the cylindrical outer lateral face of the outer sleeve extending between two annular parts of this face which are adjacent the axial ends of this outer sleeve should be at least partially made integral with such a filling core between the two branches extending the part of the bundle surrounding the outer sleeve.

In this case, it is advantageous that the formation of an integral unit with the filling core should be ensured by means of a protection affixed both to the outer sleeve and to said filling core.

In a very simple embodiment, said protection is annular and comprises at least one layer of fabric of mineral and/or organic fibers having high mechanical strength, which is wound around the outer sleeve and agglomerated by a polymerized impregnation synthetic resin ensuring at the same time the affixing of the protection to the outer sleeve and to the bundle of filaments, as well as, where appropriate, to the filling core.

In order to reinforce further the formation of an integral unit between the outer sleeve of the fastening device and the composite structure of the blade root, each one of the two annular parts of the cylindrical outer lateral face of the outer sleeve which are adjacent the axial ends of this outer sleeve is directly affixed by a polymerized synthetic resin to a covering surrounding at least the root of the spar and consisting of at least two layers, preferably crossed and inclined at substantially 45° in relation to the longitudinal direction of the spar, of fabrics of fibers which are impregnated and rigidified by said polymerized resin.

BRIEF DESCRIPTION OF THE DRAWINGS

In order that the invention may be better understood, an embodiment of the invention will now be described with reference to the accompanying drawings, in which.

DESCRIPTION OF PREFERRED EMBODIMENT

Figure 1:
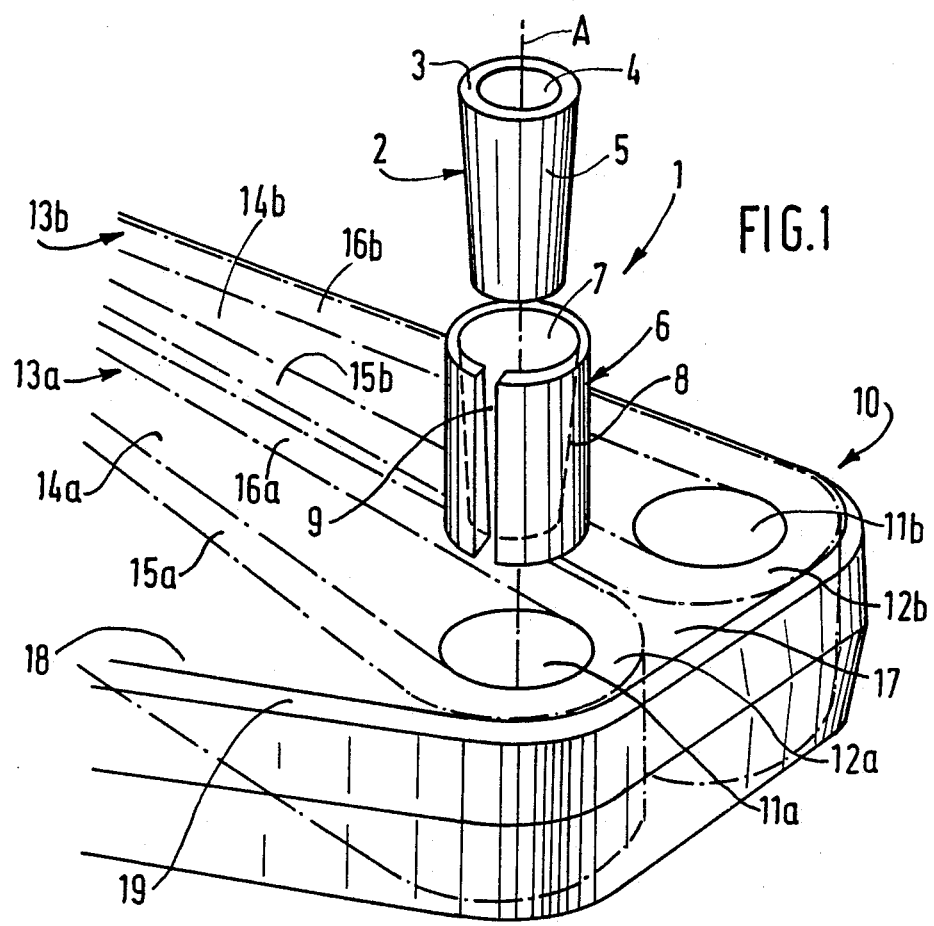
FIG. 1 is a diagrammatic exploded perspective view of the two sleeves of the device which are intended to equip one of the two loops for fastening a blade root constructed of composite material.
Figure 2:
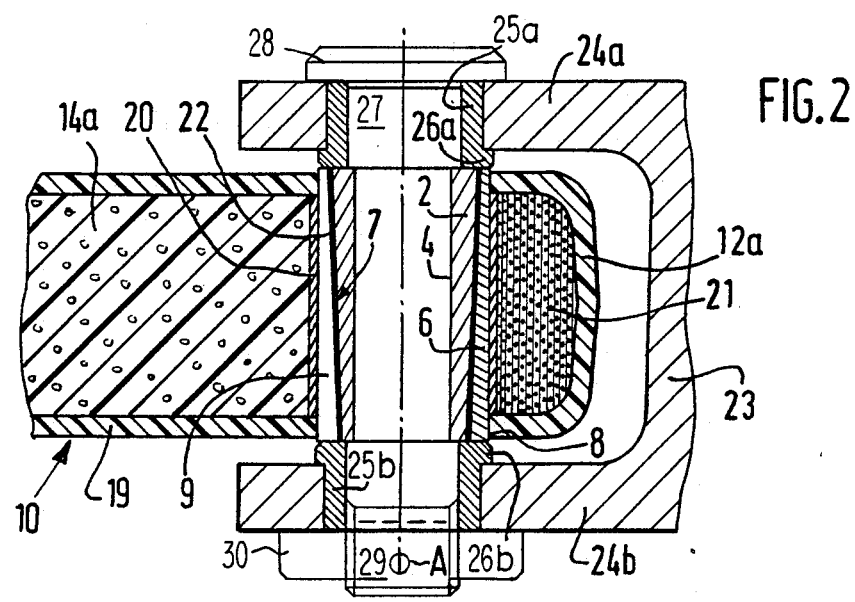
FIG. 2 is an axial cross-sectional view of a fastening device including two sleeves according to FIG. 1, equipping one of the two loops of the blade root, likewise according to FIG. 1, and mounted in a strap of a support which can be either directly the hub or an intermediate component for connection to the latter, for example an armature in the form of a double strap connected on one side to the blade and on the other to the hub, or alternatively a ferrule.

Referring to FIGS. 1 and 2, the fastening device 1, including sleeves for absorbing forces, comprises an inner metallic sleeve 2, constructed of preferably stainless steel, and having the shape of a frustrum of a cone traversed axially, from one to the other of its bases or plane axial end faces perpendicular to its axis A (and of which only the large base or upper end plane face 3 is visible in FIG. 1), by a bore delimited by a cylindrical inner surface 4 of circular cross-section. The fastening device 1 likewise comprises an outer sleeve 6, likewise constructed of preferably stainless steel, but in the form of a section of a cylinder of circular cross-section, i.e., having a cylindrical outer lateral face 8. This outer sleeve 6 is likewise traversed axially, from one to the other of its plane axial end faces perpendicular to its axis A, by a bore, but the latter is delimited by a frusto-conical inner surface 7, in accordance with the frusto-conical outer lateral face 5 of the inner sleeve 2, with which it cooperates in the course of the coaxial pressing of the inner sleeve 2 into the inner frusto-conical bore of the outer sleeve 6. The outer sleeve 6 is furthermore a sleeve slotted axially by a single slot 9 extending from one to the other of its axial end faces and along one of its generatrices, in such a manner that the outer sleeve 6 can deform in radial expansion by the axial pressing of the inner sleeve 2 into the outer sleeve 6.

As represented in FIG. 1, a fastening device 1, consisting of the two sleeves 2 and 6, is intended to be mounted in each one of the two cylindrical recesses 11a and 11b, of parallel axes, each delimited in the root 10 of a helicopter rotor blade constructed of composite materials, by a loop 12a or 12b formed by a bundle of rovings 13a and 13b emanating from a spar of the blade, and by a filling core 14a or 14b, substantially in the form of an angle, disposed between the two branches 15a and 16a or 15b and 16b, respectively, of the bundle 13a or 13b, and which extend the loop 12a or 12b of the corresponding bundle. The blade root 10 is completed by filling elements 17 and 18, which respectively fill the volumes delimited for the first, 17, between the mutually opposite convex portions of the loops 12a and 12b, and for the second 18, between, on the one hand, the branch 15a closest to the trailing edge of the blade root 10 and belonging to the bundle 13a which is itself closest to this trailing edge, and, on the other hand, the portion situated at said trailing edge of a laminated covering 19, which envelops the entire blade root 10.

On production of the composite blade, each outer sleeve 6 is placed in position in a lower or lower surface half-mold, and then the bundles of rovings 13a and 13b are disposed in this half-mold in such a manner as to constitute the spar or spars of the blade and the loops 12a and 12b of the blade root 10 which are formed in a continuous manner about the outer sleeves 6 and filling cores 14a and 14b previously positioned against the outer sleeves 6, after having surrounded with a laminated and composite protection 20 the portion of the cylindrical outer lateral surface 8 of each sleeve 6 extending between the annular parts of this surface 8 which are directly adjacent the axial ends of the sleeve 6. This protection 20, intended to protect the rovings of the loop 12a or 12b and the corresponding core 14a or 14b in relation to the corresponding metallic outer sleeve 6, is constituted by superposition of some layers of fabrics of glass fibers or of aramid fibers preimpregnated with a polymerizable agglomeration synthetic resin, forming an interposed affixing film for the connection of the protection 20 to the sleeve 6. Each filling core 14a or 14b, as indeed each one of the filling elements 17 and 18 subsequently disposed in the lower half-mold, is constituted by a block of synthetic material which is light and relatively rigid, such as a hard polyurethane foam. Each bundle of rovings 13a and 13b consists of a large number of bands 21 attached to one another and agglomerated by a polymerizable impregnation synthetic resin, each band 21 itself consisting of a large number of longitudinal and unidirectional rovings of glass fibers or of aramid fibers agglomerated side by side by the impregnation resin, which reinforces the film of adhesive formed by the impregnation resin of the protective fabric 20 (it being possible for the same resin to be utilized to impregnate these various components), for the connection to the corresponding core 14a or 14b and to the opposite internal and concave portion on the corresponding loop 12a or 12b. The laminated and composite covering 19 is of traditional structure: it consists of a stack of at least one layer, but preferably of two layers of fabrics of glass fibers, the warp and weft lines of which are crossed in one layer in relation to the other and inclined at approximately 45° in relation to the longitudinal axis or the direction of the leading edge of the blade, and at least one layer, but preferably two superposed layers of fabrics of carbon fibers, the warp and weft lines of which are likewise crossed from one layer to the other and inclined substantially at 45° in relation to the same direction, the various layers of fabrics all being preimpregnated with polymerizable agglomeration synthetic resin, which forms a film of adhesive to ensure the direct connection of the covering 19 against the annular parts of the cylindrical outer lateral surface 8 of each sleeve 6 which are adjacent the axial ends of this sleeve 6, as represented in FIG. 2.

Before the closing of the mold and the polymerization, by the closing of an upper or upper surface half-mold on the lower or lower surface half-mold, and then placing of the mold in a polymerization furnace, the inner sleeve 2 of each fastening device is pressed coaxially into the bore of the corresponding outer sleeve 6, the frusto-conical inner lateral face 7 of which has been previously coated with a film of adhesive. Likewise, the frusto-conical outer lateral surface 5 of the inner sleeve 2 can be coated with a film of adhesive before this pressing into the outer sleeve 6. Under the effect of this pressing of the frusto-conical inner sleeve 2, the slotted outer sleeve 6 can deform in radial expansion and adapt itself to various diameters or to inaccurate diameters. Thus, the outer sleeve 6 can adapt itself to the exact diameter of the cylindrical recess formed in the composite materials which surround it (loop 12a or 12b of the bundles, protection 20 and core 14a or 15b). Furthermore, this pressing ensures the affixing of the cylindrical outer lateral face 8 of the outer sleeve 6 against these composite materials which surround it, with a good contact pressure, and thus an affixing of excellent quality. In fact, the affixing is undertaken on the two interfaces, on the one hand between the composite structure of the blade root 10 and the cylindrical outer face 8 of the outer sleeve 6, by the adhesive film formed of the impregnation resin or resins, the metallic sleeve 8 thus being directly affixed against the composite laminated covering 19 and, by means of the laminated and composite protection 20, against the corresponding core 14a or 14b and against the corresponding loop 12a or 12b, and, on the other hand, between the outer sleeve 8 and the inner sleeve 2, by the adhesive film represented at 22 in FIG. 2. The axial pressure of pressing the sleeves 2 and 6, and thus the radial pressures at the location of the interfaces, are ensured and controlled during the polymerization and affixing phase; this ensures a good pressure on the affixed faces.

This process of mounting in the composite blade root 10 of a fastening device including two metallic sleeves for absorbing forces which are pressed and affixed one in the other, and of which the outer sleeve 8 is affixed under pressure to the composite materials which surround it, has the advantage of placing the whole of the zone of a loop 12a or 12b of a bundle of rovings under prestress, which ensures a mechanical blocking in the winding of corresponding rovings, and which is at the same time very beneficial for the fatigue properties of the fastening thus realized. Furthermore, this prestress significantly improves the ageing properties of the affixings.

Tests carried out by applicants have enabled these advantageous results to be verified on blades used in flight on rotors, and of which the cylindrical sleeves of the prior art, jarred in their seating, have each been replaced by a fastening device including two sleeves such as were described hereinabove.

As represented in FIG. 2, it will be noted that it is advantageous that the two sleeves 2 and 6 of a fastening device should have dimensioned in such a manner the same axial dimension, slightly greater than the thickness of the blade root 10 in its end part exhibiting the recesses 11a and 11b, and that, in their position of appropriate relative pressing, the plane axial end faces of the two sleeves are coplanar and project in relation to the opposite faces of the blade root 10 in this same end part having the recesses 11a and 11b, in such a manner as to facilitate advantageously the mounting of the blade root 10 thus equipped on its support. In FIG. 2, the support 23, which is a metallic or composite hub, or alternatively a component for connection to the hub, such as an armature or connecting ferrule, is provided with a radial strap having two branches 24a and 24b disposed in line one above the other. Where the support 23 is the hub, the upper branch 24a and the lower branch 24b of the strap may be respectively one of a plurality of radial arms of an upper hub plate and one of a plurality of radial arms of a lower hub plate. Coaxial cylindrical passages, which are aligned in the extension of one another, are formed through the two superposed branches 24a and 24b of the strap. In each one of these passages there is mounted a shouldered ring 25a or 25b, the respective shoulder 26a or 26b of which is turned towards the interior of the strap. The strap thus has two pairs of aligned and superposed bores, equipped with shouldered rings. The blade root 10, of which each recess 11a and 11b is equipped with two pressed and affixed sleeves, is introduced and centered between the branches 24a and 24b of the strap, in such a manner that the coplanar axial end faces of the two sleeves of each recess 11a and 11b are opposite the shoulders 26a and 26b of the rings 25a and 25b of the pair of corresponding passages of the branches 24a and 24b of the strap, forming bearing faces against these shoulders 26a and 26b of the rings. The fixing of the blade root 10 in the strap is then ensured by the engagement and the bearing, in the internal bores of the rings 25a and 25b and likewise of the corresponding inner sleeve 2, of a blade fastening arbor 27, one end of which is equipped with a head 28 for bearing against the upper face of the upper branch 24a of the strap, and the other end of which, projecting in relation to the lower face of the lower branch 24b of the strap, is a threaded end 29 on which a nut 30 is screwed, in accordance with a traditional mounting. Thus, the large forces to which the blade is subjected, notably in longitudinal traction under the effect of centrifugal force, are absorbed by the sleeves 2 and 6, in the form of radial loads transmitted to each fastening arbor 27 retained on the supporting strap.

It is clear that the fastening device including two metallic sleeves for absorbing forces may be utilized not only to equip novel blades, but also for the repair of rotor blades constructed of composite material already equipping helicopters currently in service and equipped with cylindrical metallic fastening sleeves of the prior art.

We claim:

1. A rotor blade for an aerodyne having an at least partially rotating wing system, said blade being constructed substantially of composite materials and having a resistant frame which includes at least one spar comprising at least one bundle of continuous filaments having high mechanical strength, said filaments being selected from the group consisting of inorganic and organic filaments and being agglomerated by a polymerized synthetic resin, said bundle forming, in a root of said spar by which said blade is intended to be operatively fastened to a blade-to-hub attachment part, at least one loop accommodating and integral with an internal sleeve-fastening device comprising first and second metallic and coaxial sleeves for absorbing forces, said sleeves being adapted to be traversed by an axle for retaining said blade on said blade-to-hub attachment part, wherein (a) said first sleeve is an inner sleeve having a frusto-conical outer lateral face centered on an axis, and a cylindrical internal bore for passage and engagement of said axle, and coaxial with said frusto-conical outer lateral face around said axis; and (b) said second sleeve is an outer sleeve having a cylindrical outer lateral face centered on said axis, two plane axial end faces perpendicular to said axis, and a frusto-conical internal bore extending from one to the other of said end faces, said bore being coaxial with said cylindrical outer lateral face and having a shape complementary to that of said frusto-conical outer lateral face of said inner sleeve, said outer sleeve being provided with a single slot extending from one to the other of said axial end faces, said inner sleeve being adapted to be pressed coaxially into said outer sleeve and made integral with said outer sleeve in an axial position corresponding to a predetermined deformation in radial expansion of said outer sleeve, which is integral by said cylindrical outer lateral face with said blade spar root, said cylindrical outer lateral face of said outer sleeve having a central part extending between two annular parts of said cylindrical outer lateral face which annular parts are each adjacent to a respective one of said axial end faces of said outer sleeve, and said central part being at least partially made integral with an opposite part of said bundle of filaments, in a portion of said bundle which surrounds said outer sleeve, by means of at least one protection element affixed to both said outer sleeve and to said bundle of filaments.

2. Rotor blade according to claim 1, wherein said inner and outer sleeves of said fastening device are made integral with one another by affixing said inner sleeve to said outer sleeve in radial expansion with a film of adhesive.

3. Rotor blade according to claim 1, wherein said inner sleeve has two plane axial end faces perpendicular to said axis, said frusto-conical outer lateral face extending between said end faces, and said inner and outer sleeves are made integral with one another in a relative axial position such that said axial end faces of said inner and outer sleeves are substantially coplanar and project in relation to opposite faces of said spar root, at the location of said loop such as to form faces bearing against assembly pieces on said blade-to-hub attachment part.

4. Rotor blade according to claim 1, wherein said bundle of filaments is formed of a plurality of bands of unidirectional rovings agglomerated by a polymerized impregnation synthetic resin, said bands being attached and agglomerated to one another by said polymerized impregnation resin simultaneously affixing said attached and agglomerated bands onto said at least one protection element in said opposite part of said bundle portion which surrounds said outer sleeve.

5. Rotor blade according to claim 1, wherein said central part of cylindrical outer lateral face of said outer sleeve extending between said two annular parts of said cylindrical outer lateral face is made at least partially integral with a filling core disposed between two branches of said bundle of filaments forming said loop and which extend said portion of said bundle surrounding said outer sleeve.

6. Rotor blade according to claim 5, wherein said central part of said cylindrical outer lateral face is made at least partially integral with said filling core by means of said at least one protection element which is affixed both to said outer sleeve and to said filling core.

7. Rotor blade according to claim 1, wherein said at least one protection element is annular and comprises at least open layer of fabric of high mechanical strength fibers selected from the group consisting of inorganic and organic fibers, said at least one layer of fiber fabric being would around said outer sleeve and agglomerated by a polymerized impregnation synthetic resin simultaneously affixing said at least one protection element to said outer sleeve and to said bundle of filaments.

8. Rotor blade according to claim 1, wherein each one of said two annular parts of said cylindrical outer lateral face of said outer sleeve is directly affixed by a polymerized synthetic resin to a covering surrounding at least said root of said spar and comprising at least two layers of fiber fabrics impregnated and agglomerated by said polymerized resin, said at least two layers being crossed with respect to each other and inclined at substantially 45° to a longitudinal direction of said spar.

* * * * *